No. 841,041. PATENTED JAN. 8, 1907.
W. NOLES.
SHAFT OR TONGUE SUPPORT FOR VEHICLES.
APPLICATION FILED DEC. 26, 1905.
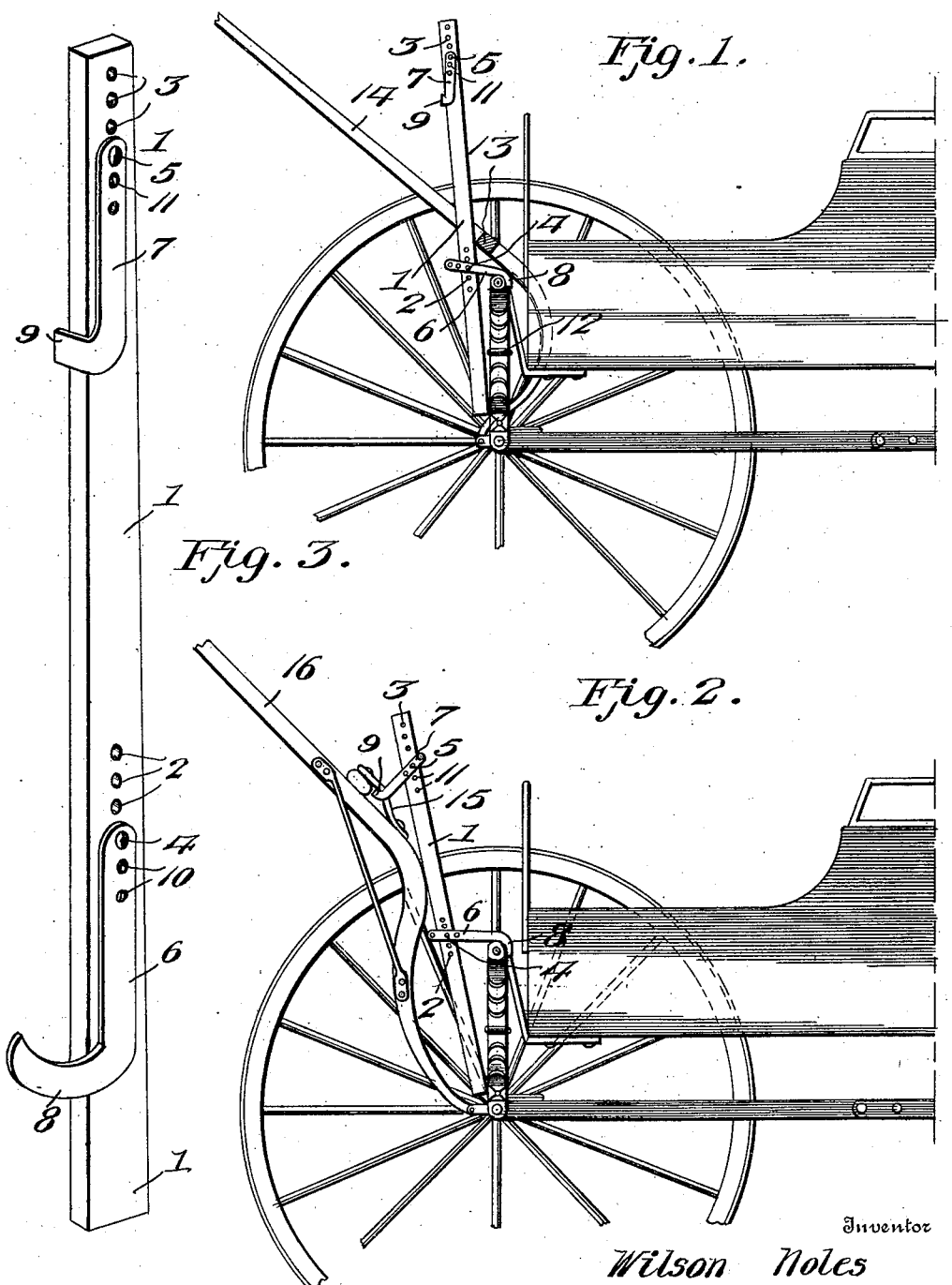
Inventor
Wilson Noles
Witnesses
Frank B. Hoffman
C. C. Hines
By Victor J. Evans
Attorney

UNITED STATES PATENT OFFICE.

WILSON NOLES, OF MONTROSE, IOWA.

SHAFT OR TONGUE SUPPORT FOR VEHICLES.

No. 841,041.  Specification of Letters Patent.  Patented Jan. 8, 1907.

Application filed December 26, 1905. Serial No. 293,344.

*To all whom it may concern:*

Be it known that I, WILSON NOLES, a citizen of the United States of America, residing at Montrose, in the county of Lee and State of Iowa, have invented new and useful Improvements in Shaft or Tongue Supports for Vehicles, of which the following is a specification.

This invention relates to a shaft or tongue support for vehicles, the object of the invention being to provide a simple, convenient, and inexpensive device adapted to be employed for holding either the thills or tongues of vehicles in an elevated position when not in use.

In the accompanying drawings, Figure 1 is a side elevation of a portion of the forward running-gear of a vehicle, showing the device as applied for holding thills of shafts elevated. Fig. 2 is a similar view showing the device as arranged for holding a tongue or pole elevated. Fig. 3 is an enlarged detail view of the support.

The supporting device comprises a bar 1, preferably made of wood and provided at a point adjacent to or below its center with a longitudinal row or series of transverse openings 2 and at the upper end thereof with a similar row or series of openings 3, the said openings being adapted for the reception of pivot-bolts 4 and 5 to position the same at different points upon the bar. The bolts 4 and 5 respectively support swinging hooks 6 and 7, the hook 6 being provided with a forwardly-extending substantially semicircular-shaped hooked portion 8 and the hook 7 with a laterally-projecting hook member 9, extending across the forward face of the bar 1. The hooks are pivotally mounted by their body or shank portions and the bolts 4 and 5 upon one side of the bar 1 and have a forward and rearward swinging movement on said bolts, the hooks being respectively provided in their shank portions with a row or series of openings 10 and 11 for the reception of the bolts, whereby they may be adjusted to regulate their effective degree of swing and extension beyond the bar, as will be readily understood.

Fig. 1 shows the device as applied for use upon a vehicle to support the shafts thereof, from which it will be seen that the bar is disposed in advance of the front vehicle-spring 12, with its lower end resting against the front axle or sand-bar applied thereto and the hook member 6 swung rearwardly on its pivot-bolt to bring the terminal 8 into engagement with the upper portion of the spring, thereby holding the bar in position. Above the spring the rear edge of the bar bears against the cross-bar 13 of the shafts 14, thus supporting the shafts in an elevated position.

Fig. 2 shows the device as applied for supporting the pole or tongue of the vehicle. The supporter is here applied to the vehicle in the manner shown in Fig. 1, the hook 6 holding it engaged with the spring 12, while the hook 7 is projected to bring its laterally-projecting portions 9 into engagement with the hammer-strap 15 of the pole or tongue 16 to support the latter in an elevated position.

It will be seen that the adjustable connection of each hook with the bar not only permits it to be vertically adjusted on the bar to hold the shafts or poles supported at different elevations, but also to vary its point of pivotal connection so that the hooked portion thereof may project a greater or less distance beyond the bar to engage the spring or hammer-strap, as the case may be, according to the distance of the same from the bar, which varies with the degree of elevation of the shafts or tongue.

It will further be seen that the device provides a simple and effective support which may be conveniently carried in the vehicle or stored in a barn or carriage-house for use and may be easily applied and removed and which when applied will hold a pole or pair of shafts firmly and securely in elevated position.

Having thus described the invention, what is claimed as new is—

1. A shaft or tongue support comprising a bar having transverse pivot-supports, and a pair of hooks arranged upon one side of the bar and pivoted one above the other to said supports to swing respectively forwardly and rearwardly of the bar.

2. A device of the character described comprising a bar provided with pivoted hooks thereon arranged one above the other, the upper hook having a laterally-projecting terminal extending in front of the bar to engage the hammer-strap of a tongue.

3. A shaft or tongue support comprising a bar provided with means of engagement to the front axle-spring of a vehicle and above such means with a pivoted hook having a laterally-projecting portion extending in front of the bar to engage the hammer-strap of a tongue.

4. A shaft or tongue support comprising a bar having hooks arranged one below the other for respective engagement with the front axle-spring of the vehicle and the hammer-strap of a tongue.

5. A shaft or tongue support comprising a bar, hooks pivotally mounted upon the bar, one above the other, and adapted respectively for forward and rearward swinging movement, the upper forwardly-swinging hook being provided with a lateral extension in front of the bar to engage the hammer-strap of a tongue.

In testimony whereof I affix my signature in presence of two witnesses.

WILSON NOLES.

Witnesses:
LOUISE W. STANWOOD,
R. E. JENNISON.